United States Patent
Ito et al.

(10) Patent No.: US 11,162,814 B2
(45) Date of Patent: Nov. 2, 2021

(54) POSITION DETECTING DEVICE, AND METHOD OF MANUFACTURING POSITION DETECTING DEVICE

(71) Applicant: DENSO CORPORATION, Kariya (JP)

(72) Inventors: Takeshi Ito, Kariya (JP); Takamitsu Kubota, Kariya (JP); Yoshiyuki Kono, Kariya (JP)

(73) Assignee: DENSO CORPORATION, Kariya (JP)

(*) Notice: Subject to any disclaimer, the term of this patent is extended or adjusted under 35 U.S.C. 154(b) by 124 days.

(21) Appl. No.: 16/264,851

(22) Filed: Feb. 1, 2019

(65) Prior Publication Data

US 2019/0162556 A1 May 30, 2019

Related U.S. Application Data

(63) Continuation of application No. PCT/JP2017/029300, filed on Aug. 14, 2017.

(30) Foreign Application Priority Data

Aug. 23, 2016 (JP) .............................. JP2016-162956
May 30, 2017 (JP) .............................. JP2017-106790

(51) Int. Cl.
*G01D 5/14* (2006.01)
*G01D 5/16* (2006.01)
*G01D 3/08* (2006.01)

(52) U.S. Cl.
CPC ............... *G01D 5/142* (2013.01); *G01D 3/08* (2013.01); *G01D 5/145* (2013.01); *G01D 5/16* (2013.01)

(58) Field of Classification Search
CPC ............ G01D 5/12; G01D 5/16; G01D 5/142; G01D 5/145; G01D 11/30; G01D 11/245; G01D 3/08; G01B 7/30
See application file for complete search history.

(56) References Cited

U.S. PATENT DOCUMENTS

| | | | |
|---|---|---|---|
| 10,199,567 B2* | 2/2019 | Itou | H01L 43/065 |
| 2008/0197481 A1* | 8/2008 | Tokuhara | H01L 23/24 257/698 |
| 2011/0221432 A1* | 9/2011 | Oota | G01R 33/0011 324/251 |
| 2013/0249544 A1* | 9/2013 | Vig | G01R 33/0047 324/252 |
| 2014/0111193 A1* | 4/2014 | Mizunuma | G01D 5/12 324/207.25 |
| 2015/0345994 A1 | 12/2015 | Mase | |
| 2018/0102473 A1* | 4/2018 | Itou | H01L 43/04 |
| 2019/0162518 A1* | 5/2019 | Uchida | G01D 5/12 |
| 2019/0170498 A1* | 6/2019 | Ito | G01D 11/245 |
| 2019/0170499 A1* | 6/2019 | Ito | G01D 5/145 |

* cited by examiner

Primary Examiner — Jermele M Hollington
(74) Attorney, Agent, or Firm — Nixon & Vanderhye, PC

(57) ABSTRACT

A position detecting device includes an IC package, a first terminal line, a ground terminal line, a power supply terminal line, a second terminal line, a bypass terminal line, motor terminal lines, and a connector portion. A bypass terminal line is positioned on an opposite side of the ground terminal line across the first terminal line or the second terminal line and is connected to a bypass portion of the ground terminal line which connects to the ground connection portion. In the connector portion, the motor terminal line, the bypass terminal line, the second terminal line, the power supply terminal line, and the first terminal line are placed in this order.

14 Claims, 13 Drawing Sheets

POSITION DETECTING DEVICE, AND METHOD OF MANUFACTURING POSITION DETECTING DEVICE

CROSS REFERENCE TO RELATED APPLICATION

The present application is a continuation application of International Patent Application No. PCT/JP2017/029300 filed on Aug. 14, 2017, which designated the U.S. and claims the benefit of priority from Japanese Patent Applications No. 2016-162956 filed on Aug. 23, 2016 and No. 2017-106790 filed on May 30, 2017. The entire disclosures of all of the above applications are incorporated herein by reference.

TECHNICAL FIELD

The present disclosure relates to a position detecting device and a method of manufacturing the position detecting device.

BACKGROUND

Conventionally, a position detecting device is used for detecting the position of an object such as a rotational axis of a movable body.

SUMMARY

According to an aspect of the present disclosure, a position detecting device includes a detector to detect an intensity relevant to a magnetic field. The detector is connected with lead lines. The lead lines are further connected to a connector via terminal lines.

BRIEF DESCRIPTION OF THE DRAWINGS

The above and other objects, features and advantages of the present disclosure will become more apparent from the following detailed description made with reference to the accompanying drawings. In the drawings.

The above and other objects, features and advantages of the present disclosure will become more apparent from the following detailed description made with reference to the accompanying drawings. In the drawings.

DETAILED DESCRIPTION

Figure 1:
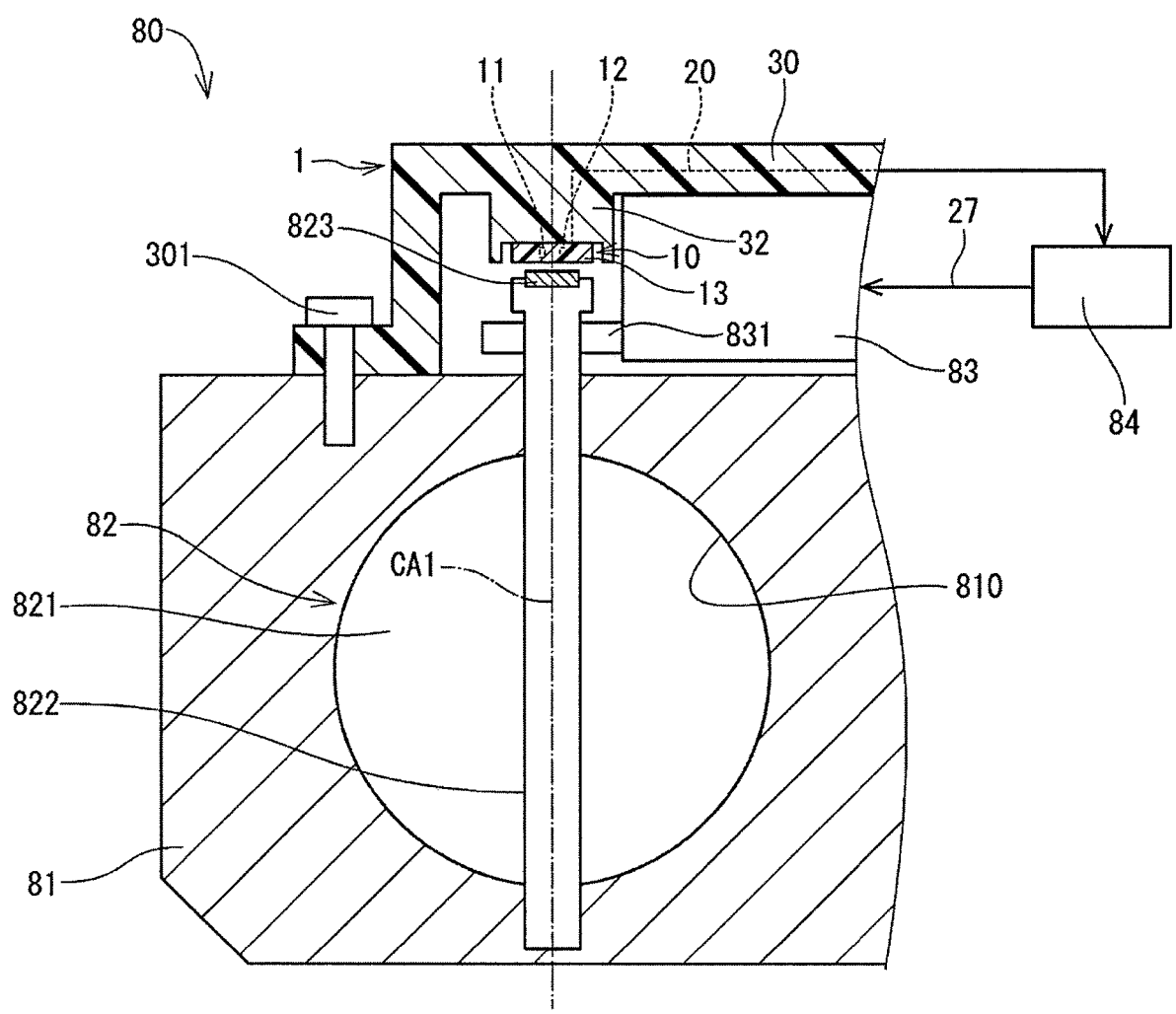
FIG. 1 is a schematic view illustrating an electronic control throttle device to which a position detecting device according to a first embodiment of the present disclosure is applied.

To begin with, an exemplified configuration of a position detecting device will be described as follows.

The position detecting device is configured to detect the position of a detection target. The position detecting device includes an IC package. In a conceivable configuration, the position detecting device may include two magnetic detection elements to detect variation in a magnetic field caused by movement of the detection target. The IC package is electrically connected with a sensor terminal. A motor terminal is further provided to supply electric power to a motor. A connector portion is further provided to enable external terminals to electrically connect with the sensor terminal and the motor terminal.

In the position detecting device as exemplified, the sensor terminal may have two signal terminal lines configured to electrically connect to the two magnetic detection elements respectively, a power supply terminal line common for the two magnetic detection elements, and a ground terminal line common for the two magnetic detection elements. Further, in a conceivable configuration of the position detecting device, one of the two signal terminal lines, the ground terminal line, the power supply terminal line or the other of the two signal terminal lines may be arranged in this order. In the conceivable configuration, the motor terminal is provided adjacently to one of the two signal terminal lines in the connector portion. Consequently, a short circuit would occur between the motor terminal and the signal terminal line. In addition, a current flowing through the motor terminal could cause a magnetic field around the motor terminal. Consequently, signals passing through the signal terminal lines may contain noise. Those issues would exert effect on the detection accuracy of the position of the detection target by using the position detecting device.

In consideration of those issues, a position detecting device may be configured to avoid occurrence of a short circuit between terminals.

In an example, a position detecting device comprises an IC package, a first terminal line, a ground terminal line, a power supply terminal line, a second terminal line, a bypass terminal line, motor terminal lines, and a connector portion. The IC package includes a first magnetic detection element, a second magnetic detection element, a sealing portion, a first lead line, a ground lead line, a power supply lead line, and a second lead line. In the sealing portion, the first magnetic detection element and the second magnetic detection element are sealed. The first lead line, the ground lead line, the power supply lead line, and the second lead line project in a first direction from the sealing portion. The ground lead line and the power supply lead line are provided between the first lead line and the second lead line. The first terminal line extends in a direction opposite to the first direction from a first connection portion electrically connectable to the first lead line. The ground terminal line includes a ground connection portion, which is electrically connectable to the ground lead line, and a bypass portion, which extends in a direction different from the first direction. The bypass portion is connected to an end of the ground connection portion in the first direction. The power supply terminal line extends in the direction opposite to the first direction from a power supply connection portion electrically connectable to the power supply lead line. The second terminal line extends in the direction opposite to the first direction from a second connection portion electrically connectable to the second lead line. The bypass terminal line is positioned on an opposite side of the ground terminal line across the first terminal line or the second terminal line and connected to the bypass portion. The motor terminal lines has one end portions electrically connected to a motor to supply electric power therethrough to the motor to rotate the detection target. In the connector portion, other end portions of the motor terminal line, an end portion of the bypass terminal line opposite to a side connected to the bypass portion, an end portion of the second terminal line opposite to the second connection portion, an end portion of the power supply terminal line opposite to the power supply connection portion, and an end portion of the first terminal line opposite to the first connection portion are placed in this order.

This example enables to arrange the four terminal lines in the connector portion in the order of the bypass terminal line connected to the ground terminal line, the second terminal line, the power supply terminal line, and the first terminal line. Accordingly, the bypass terminal line is enabled to be arranged adjacently to the motor terminal line when the four terminal lines and the motor terminal line are arranged in the connector portion. Thus, this example could restrict a short circuit between terminals in the connector portion. In addition, in this example, the first terminal line and the second terminal line can be provided in positions relatively distant from the motor terminal line. This example could enable to reduce a noise presumably contained in signals flowing through the first terminal line and the second terminal line into a relatively small level even when a magnetic field is formed by the a current flowing through the motor terminal line. Accordingly, this example could enhance the detection accuracy of the position of the detection target.

In another example, a method of manufacturing the position detecting device includes a terminal original form forming process (such as molding) and a cutting process. The terminal original form forming process includes integrally forming, as an original form of a sensor terminal, a portion that is to become the first connection portion of the first terminal line, a portion that is to become the ground connection portion of the ground terminal line, a portion that is to become the power supply connection portion of the power supply terminal line, a portion that is to become the second connection portion of the second terminal line, a portion that is to become the bypass terminal line, and a die bar, such that the die bar is connected to, on a side of the portion that is to become the ground connection portion in the first direction, the portion that is to become the first connection portion, the portion that is to become the ground connection portion, the portion that is to become the power supply connection portion, the portion that is to become the second connection portion, and the portion that is to become the bypass terminal line. The cutting process after the terminal original form forming process includes cutting off, the portion that is to become the first connection portion from the die bar, the portion that is to become the power supply connection portion from the die bar, and the portion that is to become the second connection portion from the die bar.

According to the method of this example, when the original form of the sensor terminal is machined into the sensor terminal, the ground connection portion is kept connected to the die bar and the bypass terminal line is kept connected to the die bar, while the portion that is to become the first connection portion is cut off from the die bar, the portion that is to become the power supply connection portion is cut off from the die bar, and the portion that is to become the second connection portion is cut off from the die bar. This example could facilitate to form the connector portion in which the bypass terminal line electrically connected to the ground lead line is arranged adjacently to the motor terminal line.

In another example, a position detecting device includes an IC package, a signal terminal line, a ground terminal line, a power supply terminal line, a dummy terminal line, motor terminal lines, and a connector portion. The IC package includes a magnetic detection element, a sealing portion, a signal lead line, a ground lead line, a power supply lead line, and a dummy lead line. The dummy lead line projects in the first direction from the sealing portion. The dummy lead line is not electrically connected to the magnetic detection element. The ground lead line and the power supply lead line are provided between the signal lead line and the dummy lead line. The ground terminal line includes a ground connection portion electrically connectable to the ground lead line and a bypass portion extending in a direction different from the first direction and connected to an end of the ground connection portion in the first direction. The dummy terminal line is provided on an opposite side of the signal terminal line across the ground terminal line and extending in the direction opposite to the first direction from a dummy connection portion connectable to the bypass portion and the dummy lead line. In the connector portion, other end portions of the motor terminal lines, an end portion of the dummy terminal line opposite to a side connected to the bypass portion, one of an end portion of the power supply terminal line opposite to a side connected to the power supply connection portion and an end portion of the ground terminal line opposite to a side connected to the bypass portion, the other of the end portion of the power supply terminal line opposite to the side connected to the power supply connection portion and the end portion of the ground terminal line opposite to the side connected to the bypass portion, and an end portion of the signal terminal line opposite to a side connected to the signal connection portion are placed in this order.

According to this example, the bypass portion of the ground terminal line is connected to the dummy terminal line provided on the opposite side of the signal terminal line across the ground terminal line. This example enables to arrange the ground terminal line electrically connected to the ground lead line adjacently to the motor terminal line in the connector portion. Thus, this example could enable to restrict occurrence of a short circuit between terminals in the connector portion. In addition, in this example, the signal terminal line is provided in a position relatively distant from the motor terminal line. Therefore, this example could enable to reduce a noise contained in a signal flowing through the signal terminal line to a relatively small level. Accordingly, this example could enhance the detection accuracy of the position of the detection target.

In another example, a method of manufacturing the position detecting device includes a terminal original form forming process (such as molding) and a cutting process. The terminal original form forming process includes integrally molding, as an original form of a sensor terminal, a portion that is to become the signal connection portion of the signal terminal line, a portion that is to become the ground connection portion of the ground terminal line, a portion that is to become the power supply connection portion of the power supply terminal line, a portion that is to become the dummy connection portion of the dummy terminal line, and a die bar, such that the die bar is connected to, on one side of the portion that is to become the ground connection portion in the first direction, the portion that is to become the signal connection portion, the portion that is to become the ground connection portion, the portion that is to become the power supply connection portion, and the portion that is to become the dummy connection portion. The cutting process after the terminal original form forming process includes cutting off the portion that is to become the signal connection portion from the die bar and the portion that is to become the power supply connection portion from the die bar.

According to the method of this example, when the original form of the sensor terminal is machined into the sensor terminal, the ground connection portion is kept connected to the die bar and the dummy terminal line is kept connected to the die bar while the portion that is to become the signal connection portion is cut off from the die bar and the portion that is to become the power supply connection portion is cut off from the die bar. This example could facilitate to form the connector portion in which the dummy terminal line electrically connected to the ground lead line is enabled to be arranged adjacently to the motor terminal line.

Embodiments of the present disclosure will be described below with reference to the drawings. Substantially the same components of embodiments are given the same reference numerals and descriptions thereof are omitted.

First Embodiment

A position detecting device according to a first embodiment will be described with reference to FIGS. 1, 2, 3, 4A, and 4B. A rotation angle detecting device 1, which is "the position detecting device" according to the first embodiment, is used in an electronic control throttle device 80 that controls the amount of intake air supplied to an engine installed in a vehicle (not illustrated).

First, the structure of the electronic control throttle device 80 will be described. As illustrated in FIG. 1, the electronic control throttle device 80 includes a valve housing 81, a throttle valve 82, a motor 83, the rotation angle detecting device 1, an electronic control unit (referred to below as the ECU) 84, and the like.

The valve housing 81 includes an intake air passage 810 through which air is introduced to the engine. The throttle valve 82 is provided in the intake air passage 810.

The throttle valve 82 includes the valve member 821 and a valve shaft 822 as "detection targets".

The valve member 821 is a substantially disk-shaped member having an outer diameter slightly smaller than the inner diameter of the intake air passage 810. The valve member 821 is fixed to the valve shaft 822.

Both sides of the valve shaft 822 are rotatably supported by the valve housing 81. This causes the valve member 821 to rotate about a rotation shaft CA1 of the valve shaft 822 as a rotation shaft. A magnet 823 is provided in an end portion of the valve shaft 822 close to the rotation angle detecting device 1. When the valve shaft 822 rotates, a magnetic field in the vicinity of an IC package 10 included in the rotation angle detecting device 1 changes.

The motor 83 is accommodated in the rotation angle detecting device 1. The motor 83 is coupled to the valve shaft 822 via a coupling member 831. The motor 83 generates a rotational torque to rotate the valve shaft 822. The motor 83 is electrically connected to the ECU 84.

The ECU 84 is a small computer including a CPU as computation unit, a ROM and a RAM as storage unit, input-output unit, and the like. The ECU 84 determines the opening of the throttle valve 82 according to the travel state of the vehicle in which the electronic control throttle device 80 is installed and the operational state of the driver of the vehicle. The ECU 84 outputs electric power to the motor 83 according to the opening of the throttle valve 82. This controls the opening of the throttle valve 82 and adjusts the amount of intake air supplied to the engine.

Figure 2:
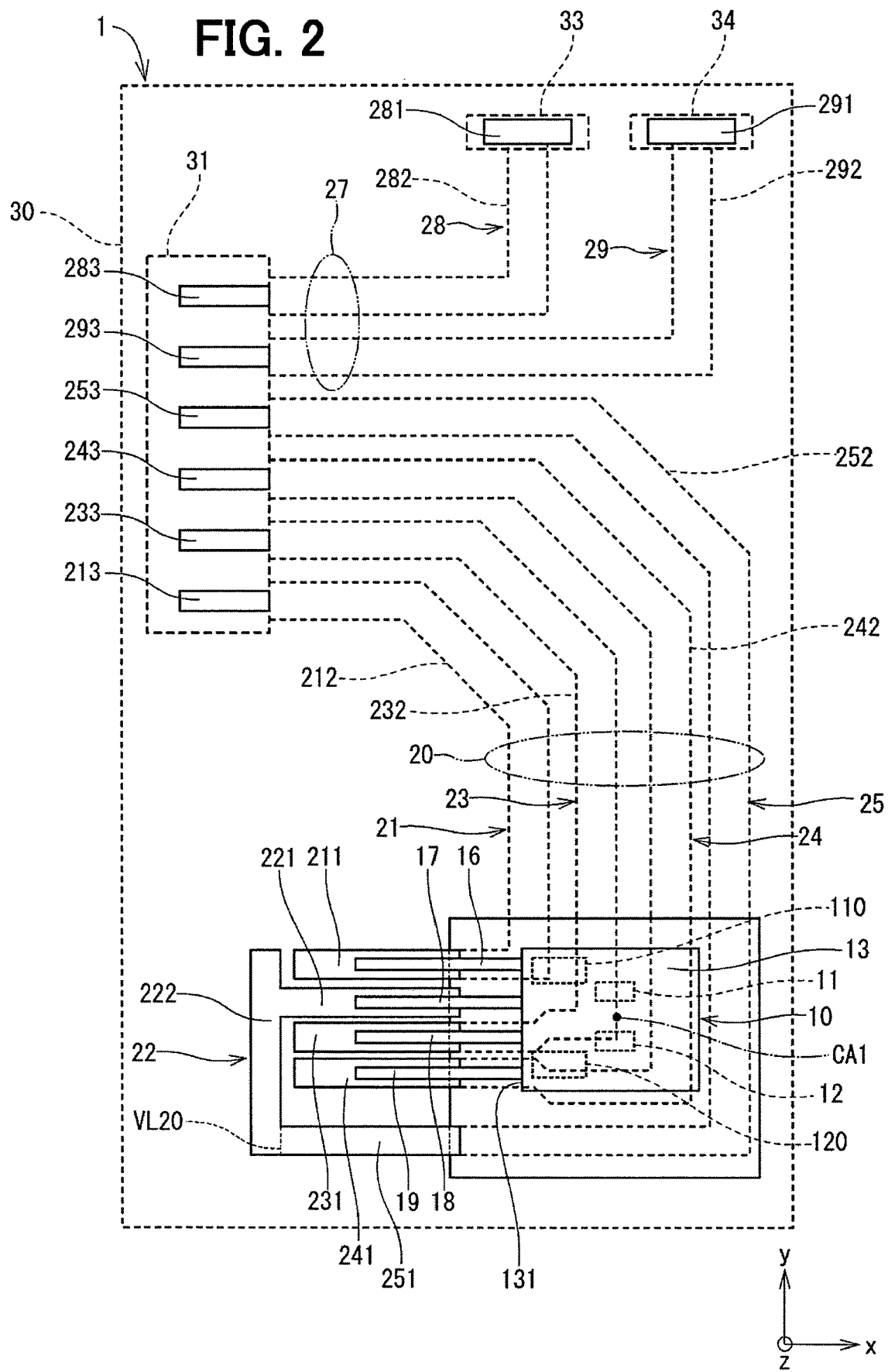
FIG. 2 is a schematic view illustrating the position detecting device according to the first embodiment of the present disclosure.

The rotation angle detecting device 1 includes the IC package 10, a sensor terminal 20, a motor terminal 27, and a sensor housing 30, which is "the housing". The rotation angle detecting device 1 is provided in the part of the valve housing 81 close to the end portion of the valve shaft 822 in which the magnet 823 is provided. FIG. 2 represents the sensor housing 30 using a dotted line and schematically illustrates the shapes and the disposition of the IC package 10, the sensor terminal 20, and the motor terminal 27.

The IC package 10 is an IC package referred to as two-system output type or two-output type and includes a first magnetic detection element 11, a first signal processing circuit 110, a second magnetic detection element 12, a second signal processing circuit 120, a sealing portion 13, a first lead line 16, a ground lead line 17, a power supply lead line 18, and a second lead line 19. The IC package 10 is provided in the vicinity of the magnet 823 on the rotation shaft CA1, as illustrated in FIG. 1.

The first magnetic detection element 11 is configured to output a first signal that depends on a first component of the magnetic field formed by the magnet 823 or the strength of the first component. The first magnetic detection element 11 is electrically connected to the power supply lead line 18, the ground lead line 17, and the first signal processing circuit 110.

The first signal processing circuit 110 is electrically connected to the first lead line 16. The first signal processing circuit 110 processes the first signal output by the first magnetic detection element 11.

The second magnetic detection element 12 is configured to output a second signal that depends on a second component different from the first component of the magnetic field formed by the magnet 823 or the strength of the second component. The second magnetic detection element 12 is electrically connected to the power supply lead line 18, the ground lead line 17, and the second signal processing circuit 120.

The second signal processing circuit 120 is electrically connected to the second lead line 19. The second signal processing circuit 120 processes the second signal output by the second magnetic detection element 12.

The sealing portion 13 is used to seal the first magnetic detection element 11, the first signal processing circuit 110, the second magnetic detection element 12, and the second signal processing circuit 120 and formed in a substantially rectangular parallelepiped.

The first lead line 16 is formed so as to project in a direction substantially orthogonal to the rotation shaft CA1 from a surface 131 of the sealing portion 13. The first signal output by the first signal processing circuit 110 is configured to be output to the outside through the first lead line 16.

A coordinate plane is set in FIG. 2 to conveniently describe the shapes and disposition of the IC package 10, the sensor terminal 20, and the motor terminal 27. The axis parallel with the direction in which the first lead line 16 projects is defined to be the x-axis and the direction in which the first lead line 16 projects is defined to be the negative direction of the x-axis. That is, the first lead line 16 projects in the negative direction of the x-axis, which is "the first direction", from the surface 131. In addition, the axis orthogonal to the x-axis and the rotation shaft CA1 is defined to be the y-axis. In addition, the axis orthogonal to the x-axis and the y-axis is defined to be the z-axis.

The ground lead line 17 is formed so as to project in the negative direction of the x-axis from the surface 131 of the sealing portion 13. A current that has flowed through the first magnetic detection element 11 and the second magnetic detection element 12 flows to the ground through the ground lead line 17.

The power supply lead line 18 is formed so as to project in the negative direction of the x-axis from the surface 131 of the sealing portion 13. The current toward the first magnetic detection element 11 and the second magnetic detection element 12 from a power supply (not illustrated) flows through the power supply lead line 18.

The second lead line 19 is formed so as to project in the negative direction of the x-axis from the surface 131 of the sealing portion 13. The second signal output by the second signal processing circuit 120 is configured to be output to the outside through the second lead line 19.

In the IC package 10 according to the first embodiment, the first lead line 16, the ground lead line 17, the power supply lead line 18, and the second lead line 19 are arranged in this order from the positive side to the negative side of the y-axis so as to project in the negative direction of the x-axis.

The sensor terminal 20 includes a first terminal line 21, a ground terminal line 22, a power supply terminal line 23, a second terminal line 24, and a bypass terminal line 25. The sensor terminal 20, which is a member having a relatively large conductivity, is formed so as to extend from the vicinity of the first lead line 16 or the like to a connector portion 31 of the sensor housing 30 through the opposite side of the magnet 823 of the IC package 10. The sensor terminal 20 is formed integrally with the sensor housing 30 by insert molding of the sensor housing 30 (see FIG. 1).

The first terminal line 21 includes a first welding terminal 211, which is "the first connection portion", a first insert portion 212, and a first connector terminal 213, which is "the end portion of the first terminal line opposite to the first connection portion".

The first welding terminal 211 is provided in a position in which welding to the first lead line 16 is enabled. The first welding terminal 211 is formed so as to extend in the positive direction of the x-axis, which is "the direction opposite to the first direction", from the tail end of the first terminal line 21. The side of the first welding terminal 211 opposite to the tail end of the first terminal line 21 is connected to the first insert portion 212.

The first insert portion 212 is inserted into the sensor housing 30. The first insert portion 212 is formed so as to extend in the positive direction of the y-axis through the opposite side of the magnet 823 of the IC package 10 and then extend in the negative direction of the x-axis. The side of the first insert portion 212 opposite to the side connected to the first welding terminal 211 is connected to the first connector terminal 213.

The first connector terminal 213 is positioned in the connector portion 31. The first connector terminal 213 is formed so as to be electrically connectable to the ECU 84 via an external connector. The first terminal line 21 outputs the first signal that has been output by the first signal processing circuit 110 to the ECU 84.

The ground terminal line 22 includes a ground welding terminal 221, which is "the ground connection portion", and a bypass portion 222.

The ground welding terminal 221 is provided in a position in which welding to the ground lead line 17 is enabled. The ground welding terminal 221 is formed so as to extend in the negative direction of the x-axis from the tail end of the ground terminal line 22. That is, the ground welding terminal 221 is formed so as to extend in a direction opposite to the first welding terminal 211. The side of the ground welding terminal 221 opposite to the tail end of the ground terminal line 22 is connected to the bypass portion 222.

The bypass portion 222 is formed so as to extend in the y-direction, which is "the direction different from the first direction". The bypass portion 222 is positioned in the negative direction of the x-axis with respect to the first welding terminal 211, the ground welding terminal 221, a power supply welding terminal 231 of the power supply terminal line 23, and a second welding terminal 241 of the second terminal line 24. The bypass portion 222 is connected to the ground welding terminal 221 on the positive side of the x-axis. The end portion of the bypass portion 222 positioned in the negative direction of the y-axis is connected to the bypass terminal line 25.

The power supply terminal line 23 includes the power supply welding terminal 231, which is "the power supply connection portion", a power supply insert portion 232, and a power supply connector terminal 233, which is "the end portion of the power supply terminal line opposite to the power supply connection portion".

The power supply welding terminal 231 is provided in a position in which welding to the power supply lead line 18 is enabled. The power supply welding terminal 231 is formed so as to extend in the positive direction of the x-axis from the tail end of the power supply terminal line 23. The side of the power supply welding terminal 231 opposite to the tail end of the power supply terminal line 23 is connected to the power supply insert portion 232.

The power supply insert portion 232 is inserted into the sensor housing 30. The power supply insert portion 232 is formed so as to extend in the positive direction of the y-axis through the opposite side of the magnet 823 of the IC package 10 and then extend in the negative direction of the x-axis. The side of the power supply insert portion 232 opposite to the side connected to the power supply welding terminal 231 is connected to the power supply connector terminal 233.

The power supply connector terminal 233 is positioned in the connector portion 31. The power supply connector terminal 233 is formed so as to be electrically connectable to a power supply (not illustrated) via an external connector (not illustrated). The current toward the first magnetic detection element 11 and the second magnetic detection element 12 from the power supply flows through the power supply terminal line 23.

The second terminal line 24 includes the second welding terminal 241, which is "the second connection portion", a second insert portion 242, and a second connector terminal 243, which is "the end portion of the second terminal line opposite to the second connection portion".

The second welding terminal 241 is provided in a position in which welding to the second lead line 19 is enabled. The second welding terminal 241 is formed so as to extend in the positive direction of the x-axis from the tail end of the second terminal line 24. The side of the second welding terminal 241 opposite to the tail end of the second terminal line 24 is connected to the second insert portion 242.

The second insert portion 242 is inserted into the sensor housing 30. The second insert portion 242 is formed so as to extend in the positive direction of the y-axis through the opposite side of the magnet 823 of the IC package 10 and then extend in the negative direction of the x-axis. The side of the second insert portion 242 opposite to the side connected to the second welding terminal 241 is connected to the second connector terminal 243.

The second connector terminal 243 is positioned in the connector portion 31. The second connector terminal 243 is formed so as to be electrically connectable to the ECU 84 via an external connector. The second terminal line 24 outputs the second signal output by the second signal processing circuit 120 to the ECU 84.

The bypass terminal line 25 includes a bypass connection portion 251, a bypass insert portion 252, and a bypass terminal 253, which is "the end portion of the bypass terminal line opposite to the side connected to the bypass portion".

As illustrated in FIG. 2, the bypass connection portion 251 is positioned in the negative direction of the y-axis with respect to the second welding terminal 241 of the second terminal line 24. That is, the bypass connection portion 251 is positioned on the opposite side of the ground terminal line 22 with respect to the second terminal line 24. The side of the bypass connection portion 251 opposite to the side connected to the bypass portion 222 is connected to the bypass insert portion 252. In FIG. 2, the virtual boundary line between the bypass portion 222 and the bypass connection portion 251 is represented by a dotted line VL20.

The bypass insert portion 252 is inserted into the sensor housing 30. The bypass insert portion 252 is formed so as to extend in the positive direction of the y-axis through the opposite side of the magnet 823 of the IC package 10 and then extend in the negative direction of the x-axis. The side of the bypass insert portion 252 opposite to the side connected to the bypass connection portion 251 is connected to the bypass terminal 253.

The bypass terminal 253 is positioned in the connector portion 31. The bypass terminal 253 is formed so as to be electrically connectable to the ground via an external connector. This connects the ground lead line 17 to the ground via the ground welding terminal 221, the bypass portion 222 of the ground terminal line 22, the bypass connection portion 251, the bypass insert portion 252, and the bypass terminal 253 of the bypass terminal line 25.

The motor terminal 27 includes two motor terminal lines 28 and 29. The two motor terminal lines 28 and 29 have motor connection terminals 281 and 291, which are "one end portions of the motor terminal lines", motor insert portions 282 and 292, and motor connector terminals 283 and 293, which are "the other end portions of the motor terminal lines", respectively.

The motor connection terminals 281 and 291 are provided in sockets 33 and 34 of the sensor housing 30. The sockets 33 and 34 are formed so as to engage with the motor 83. This enables the motor connection terminals 281 and 291 to be connected to external terminals (not illustrated) of the motor 83. The motor connection terminals 281 and 291 are connected to the motor insert portions 282 and 292.

The motor insert portions 282 and 292 are inserted into the sensor housing 30. The end portions of the motor insert portions 282 and 292 opposite to the sides connected to the motor connection terminals 281 and 291 are connected to the motor connector terminals 283 and 293.

The motor connector terminals 283 and 293 are positioned in the connector portion 31. The motor terminal 27 can supply electric power supplied by the power supply to the motor 83 via the connector portion 31.

The sensor housing 30 is a hollow member formed in a substantially rectangular parallelepiped and has the length in the x-direction shorter than the length in the y-direction, as illustrated in FIG. 2. The part of the sensor housing 30 close to the valve housing 81 has an opening as illustrated in FIG. 1 so as to accommodate the motor 83 therein. The sensor housing 30 is fixed to the valve housing 81 through a bolt 301 so as to disable relative movement. The sensor housing 30 has a stage 32 on which the IC package 10 can be mounted (see FIG. 1). This enables the IC package 10 to be provided in the vicinity of the magnet 823. A part of the sensor terminal 20 is inserted into the stage 32.

Next, the method of manufacturing the rotation angle detecting device 1 will be described with reference to FIG. 3A and FIG. 3B.

First, the original form of the sensor terminal 20 and the original form of the motor terminal 27 are formed by, for example, press work of a metal plate, which is "the terminal original form forming process". At this time, the original form of the sensor terminal 20 has a die bar to which the original form of the first terminal line 21, the original form of the ground terminal line 22, the original form of the power supply terminal line 23, the original form of the second terminal line 24, and the original form of the bypass terminal line 25 are connected. In addition, the original form of the motor terminal 27 has a die bar to which the original forms of the two motor terminal lines 28 and 29 are connected.

Figure 3A:
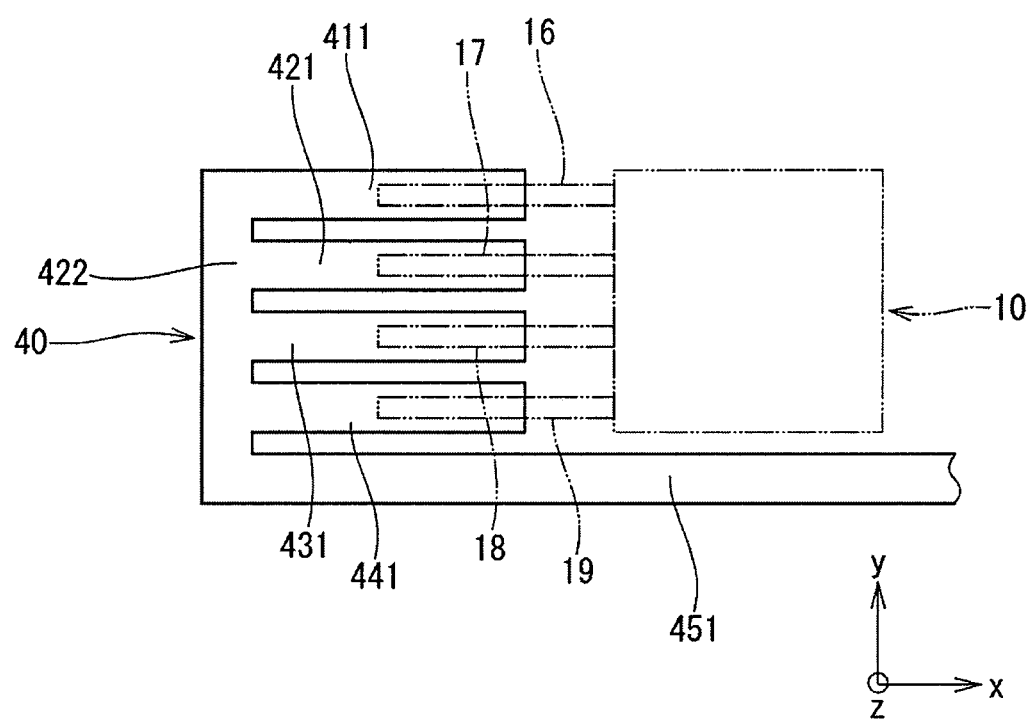
FIG. 3A is a schematic view for describing a method of manufacturing the position detecting device according to the first embodiment of the present disclosure.
Figure 3B:
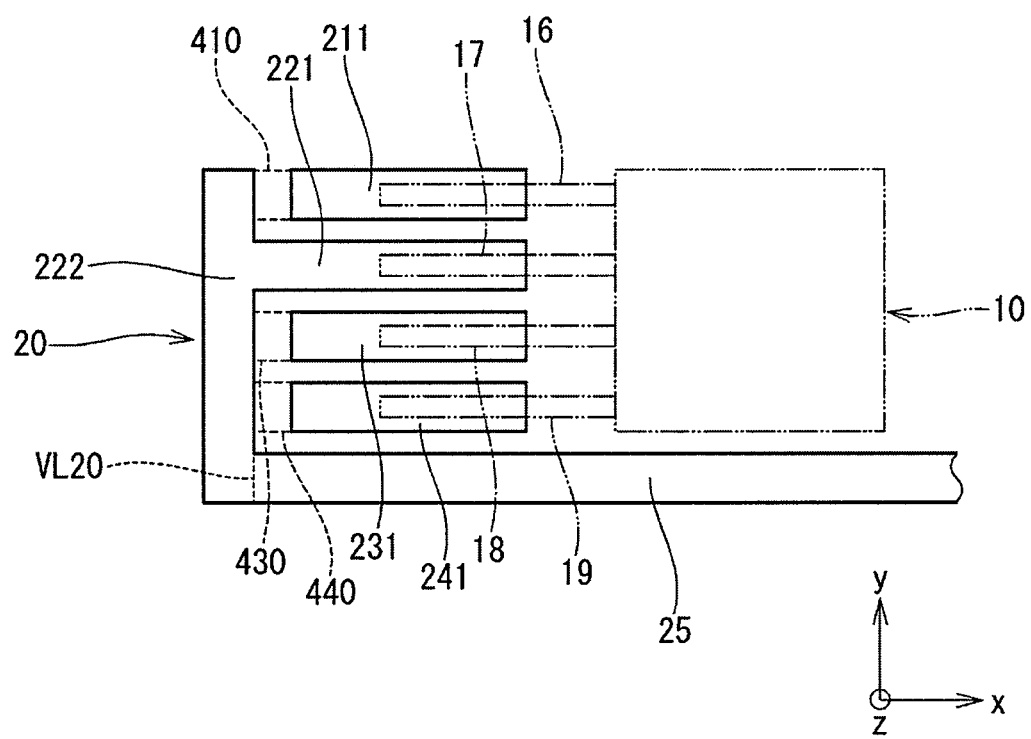
FIG. 3B is a schematic view different from FIG. 3A for describing a method of manufacturing the position detecting device according to the first embodiment of the present disclosure.

FIG. 3A is a partial enlarged view illustrating an original form 40 of the sensor terminal 20. In FIG. 3A, the IC package 10 to be connected to the sensor terminal 20 is represented by a dot-dot-dash line.

In the original form 40 of the sensor terminal 20, a portion 411 that is to become the first welding terminal 211, a portion 421 that is to become the ground welding terminal 221, a portion 431 that is to become the power supply welding terminal 231, a portion 441 that is to become the second welding terminal 241, and a portion 451 that is to become the bypass terminal line 25 are connected via a die bar 422 that is to become the bypass portion 222.

Next, the sensor housing 30 into which the sensor terminal 20 and the motor terminal 27 have been inserted is molded as "a cutting process". FIG. 3B is a partial enlarged view illustrating the original form 40 of the sensor terminal 20 used to mold the sensor housing 30. In FIG. 3B, the IC package 10 to be connected to the sensor terminal 20 is represented by a dot-dot-dash line.

When the sensor housing 30 is molded, in the original form 40 of the sensor terminal 20, the portion 421 is kept connected to the die bar 422 while the portion 411 is cut off from the die bar 422, the portion 431 is cut off from the die bar 422, and the portion 441 is cut off from the die bar 422. In FIG. 3B, the portions that have been cut off at this time are represented by dotted lines 410, 430, and 440. The sensor terminal 20 formed by cutting off the portions 411, 431, and 441 from the die bar 422 and the motor terminal lines 28 and 29 from which the die bar has been cut off are set in a metal mold and then resin is injected into the metal mold to mold the sensor housing 30.

Finally, the IC package 10 that has been manufactured separately is mounted on the stage 32 of the sensor housing 30 and the first welding terminal 211 whose original form is the portion 411 is electrically connected to the first lead line 16, the ground welding terminal 221 whose original form is the portion 421 is electrically connected to the ground lead line 17, the power supply welding terminal 231 whose original form is the portion 431 is electrically connected to the power supply lead line 18, and the second welding terminal 241 whose original form is the portion 441 is electrically connected to the second lead line 19 by welding or the like.

This brings the rotation angle detecting device 1 to completion.

Next, the effects of the rotation angle detecting device 1 will be described with reference to FIG. 4A and FIG. 4B.

Figure 4A:
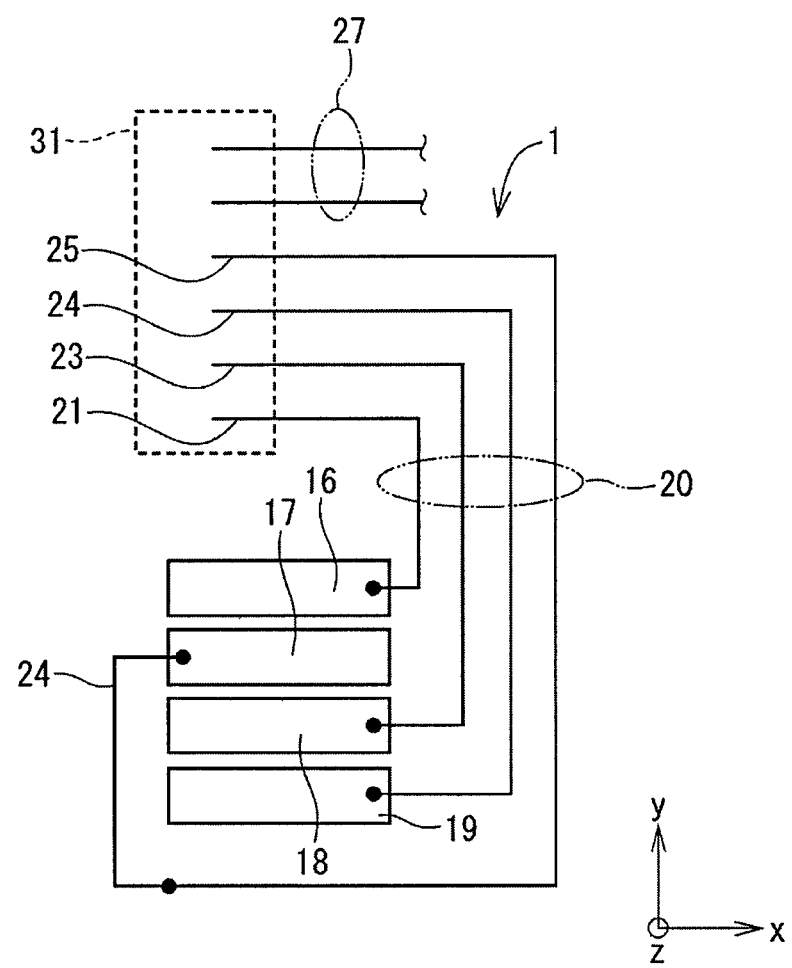
FIG. 4A is a schematic view for describing effects of the position detecting device according to the first embodiment of the present disclosure.

(A) FIG. 4A illustrates the positional relationship between the first lead line 16, the ground lead line 17, the power supply lead line 18, and the second lead line 19 and the first terminal line 21, the ground terminal line 22, the power supply terminal line 23, and the second terminal line 24 in the rotation angle detecting device 1 according to the first embodiment. In addition, FIG. 4B illustrates the positional relationship between a first lead line 96, a ground lead line 97, a power supply lead line 98, and a second lead line 99 and a first terminal line 91, a ground terminal line 92, a power supply terminal line 93, and a second terminal line 94 in a rotation angle detecting device 90 according to the comparative example. In the rotation angle detecting device 90 according to the comparative example, unlike the rotation angle detecting device 1, the portion of the ground terminal line 92 welded to the ground lead line 97 is formed so as to extend in the positive direction of the x-axis.

Figure 4B:
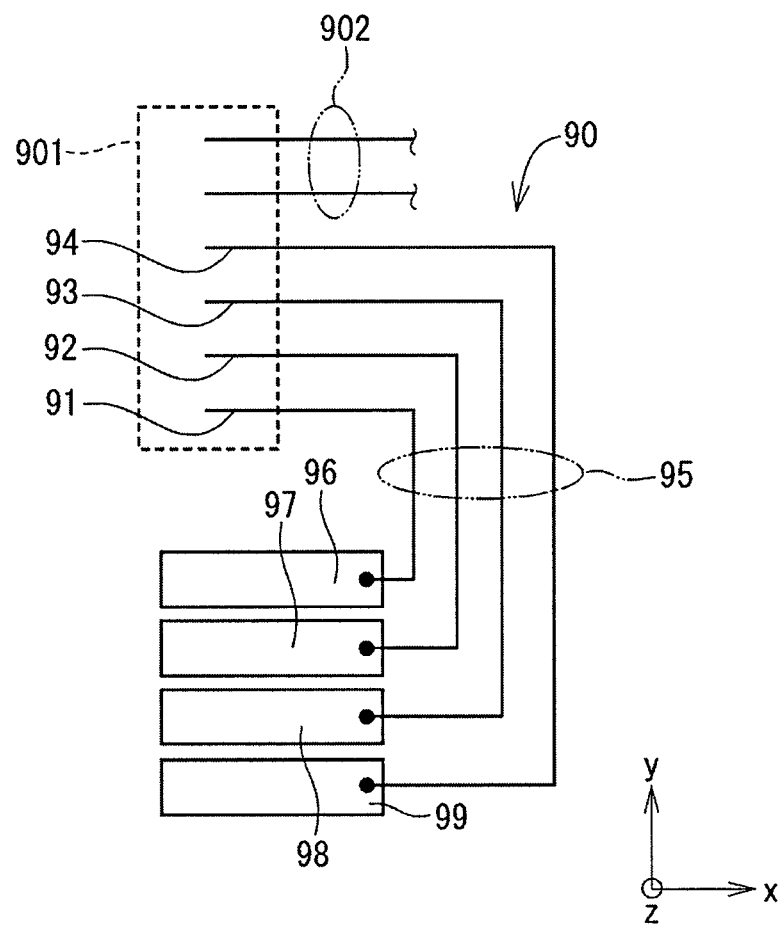
FIG. 4B is a schematic view for describing a position detecting device according to a comparative example.

In the rotation angle detecting device 90 according to the comparative example, in a case where a sensor terminal 95 extends from the vicinity of the power supply lead line 98 or the like to a connector portion 901, the first terminal line 91, the ground terminal line 92, the power supply terminal line 93, and the second terminal line 94 are arranged in this order in the connector portion 901 as illustrated in FIG. 4B. Accordingly, since the second terminal line 94 is positioned adjacently to a motor terminal 902 of the rotation angle detecting device 90, a short circuit would occur between the motor terminal 902 and the second terminal line 94 in the rotation angle detecting device 90 according to the comparative example.

On the other hand, in the rotation angle detecting device 1 according to the first embodiment, the ground terminal line 22 connected to the ground lead line 17 is connected to the bypass terminal line 25 positioned on the opposite side of the ground terminal line 22 across the second terminal line 24. Accordingly, in the connector portion 31, the bypass terminal 253 of the bypass terminal line 25 electrically connected to the ground terminal line 22 is arranged adjacently to the motor connector terminals 283 and 293 of the motor terminal lines 28 and 29. This enables to restrict a short circuit between the motor terminal 27 and the sensor terminal 20 in the connector portion 31 as compared with the case in which the second connector terminal 243 and the like are arranged adjacently to the motor connector terminals 283 and 293.

(B) In addition, in the rotation angle detecting device 90 according to the comparative example, a current flowing through the motor terminal 902 may cause noise in the second signal passing through the second terminal line 94 adjacent to the motor terminal 902. Accordingly, the rotation angle of the throttle valve 82 cannot be detected accurately.

In the rotation angle detecting device 1 according to the first embodiment, the first terminal line 21 and the second terminal line 24 are provided in positions relatively distant from the motor terminal lines 28 and 29. This enables to reduce noise caused in the first signal and the second signal due to a magnetic field caused by a current flowing through the motor terminal lines 28 and 29. Accordingly, the detection accuracy of the rotation angle of the valve member 821 could be enhanced.

(C) In addition, in the rotation angle detecting device 1 according to the first embodiment, the ground terminal line 22 does not need to be routed along the rotation shaft CA1 with respect to the first terminal line 21, the power supply terminal line 23, and the second terminal line 24 to obtain the effects (A) and (B) described above. This restricts the size of the rotation angle detecting device 1 from becoming large.

(D) In the method of manufacturing the rotation angle detecting device 1 according to the first embodiment, when the original form 40 of the sensor terminal 20 is used as the sensor terminal 20, the die bar 422 kept connected to the portion 421 that is to become the ground welding terminal 221 and the portion 451 that is to become the bypass terminal line 25 is used as the bypass portion 222 of the ground terminal line 22 while the portion 411 that is to become the first welding terminal 211 is cut off from the die bar 422, the portion 431 that is to become the power supply welding terminal 231 is cut off from the die bar 422, and the portion 441 that is to become the second welding terminal 241 is cut off from the die bar 422. This facilitates to form the connector portion 31 in which the bypass terminal line 25 electrically connected to the ground terminal line 22 is enabled to be arranged adjacently to the motor terminal 27.

Second Embodiment

Figure 5:
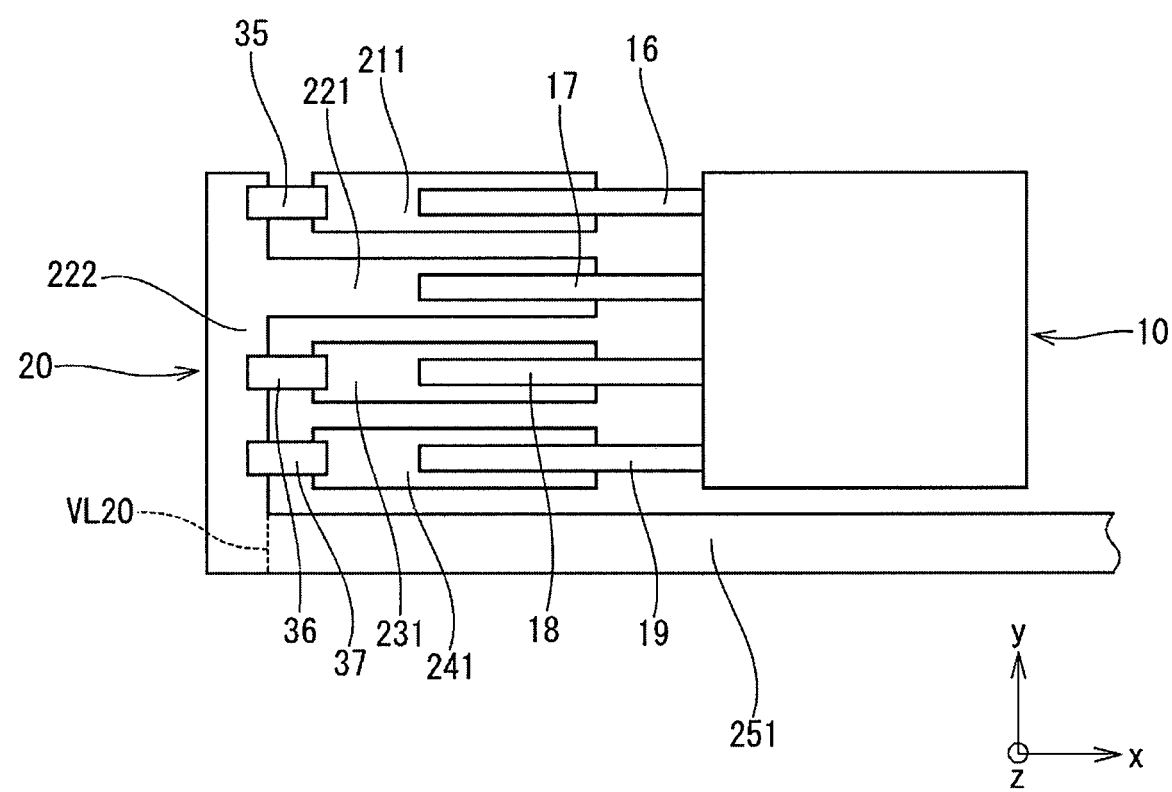
FIG. 5 is a schematic view illustrating a position detecting device according to a second embodiment of the present disclosure.

A position detecting device according to a second embodiment will be described with reference to FIG. 5. The second embodiment is different from the first embodiment in that capacitors are provided.

A rotation angle detecting device according to the second embodiment includes the IC package 10, the sensor terminal 20, the motor terminal 27, capacitors 35, 36, 37, and the sensor housing 30.

The capacitors 35, 36, and 37 are provided in the IC package 10.

The capacitor 35 is provided so as to connect the first welding terminal 211 and the bypass portion 222 in a direction along the x-axis.

The capacitor 36 is provided so as to connect the power supply welding terminal 231 and the bypass portion 222 in a direction along the x-axis.

The capacitor 37 is provided so as to connect the second welding terminal 241 and the bypass portion 222 in a direction along the x-axis.

Since a capacitor (not illustrated) sealed by the sealing portion 13 together with the first magnetic detection element 11, the first signal processing circuit 110, the second magnetic detection element 12, and the second signal processing circuit 120 is restricted in size to reduce the size of the IC package 10, it is difficult to obtain a certain level of EMC resistance.

Accordingly, in the rotation angle detecting device according to the second embodiment, noise can be reduced by providing the external capacitors 35 and 36, 37 between the first welding terminal 211 and the bypass portion 222, between the power supply welding terminal 231 and the bypass portion 222, and between the second welding terminal 241 and the bypass portion 222. Therefore, the second embodiment can obtain the same effects as the first embodiment and improve EMC resistance.

In addition, in the process of manufacturing the rotation angle detecting device according to the second embodiment, the capacitors 35, 36, and 37 can be provided in the regions in which the die bar is cut off. This can easily provide the capacitors 35, 36, and 37 between the IC package 10 and the sensor terminal 20.

In addition, in the rotation angle detecting device according to the second embodiment, the capacitors 35, 36, and 37 are connected in the direction along the x-axis, which is the short direction of the sensor housing 30. This enables to restrict the breakage of the capacitors 35, 36, and 37 when the sensor housing 30 thermally expands because thermal expansion in the short direction is relatively small.

Third Embodiment

A position detecting device according to a third embodiment will be described with reference to FIGS. 6, 7A, and 7B. The third embodiment is different from the first embodiment in the shapes of the IC package and the sensor terminal.

A rotation angle detecting device 3 according to the third embodiment includes an the IC package 50, a sensor terminal 60, the motor terminal 27, and a sensor housing 70, which is "the housing". The rotation angle detecting device 3 is provided in the part of the valve housing 81 close to the end portion of the valve shaft 822 in which the magnet 823 is provided. FIG. 6 represents the sensor housing 70 using a dotted line and schematically illustrates the shapes and the disposition of the IC package 50, the sensor terminal 60, and the motor terminal 27.

The IC package 50 includes the first magnetic detection element 11, which is "the magnetic detection element", the first signal processing circuit 110, the sealing portion 13, the first lead line 16, which is "the signal lead line", the ground lead line 17, the power supply lead line 18, and a dummy lead line 59. The IC package 50 is an IC package that has one magnetic detection element unlike the first embodiment. The IC package 50 is provided in the vicinity of the magnet 823 on the rotation shaft CA1.

The dummy lead line 59 is formed so as to project in the negative direction of the x-axis from the surface 131 of the sealing portion 13. The dummy lead line 59 is not electrically connected to the first magnetic detection element 11 and provided on the opposite side of the ground lead line 17 across the power supply lead line 18.

The sensor terminal 60 includes the first terminal line 21, which is "the signal terminal line" having the first welding terminal 211 as "the signal connection portion" that can be welded to the first lead line 16, the ground terminal line 62, the power supply terminal line 23, and a dummy terminal line 64. The sensor terminal 60, which is a member having a relatively large conductivity, is formed so as to extend from the vicinity of the first lead line 16 or the like to a connector portion 71 of the sensor housing 70 through the opposite side of the magnet 823 of the IC package 50. The sensor terminal 60 is formed integrally with the sensor housing 70 by insert molding of the sensor housing 70.

The ground terminal line 62 includes a ground welding terminal 621, which is "the ground connection portion", a bypass portion 622, a ground insert portion 620, and a ground connector terminal 623, which is "the end portion of the ground terminal line opposite to the bypass portion".

The ground welding terminal 621 is provided in a position in which welding to the ground lead line 17 is enabled. The ground welding terminal 621 is formed so as to extend in a direction along the x-axis. The side of the ground welding terminal 621 positioned in the negative direction of the x-axis is connected to the bypass portion 622. The side of the ground welding terminal 621 positioned in the positive direction of the x-axis is connected to the ground insert portion 620.

The bypass portion 622 is formed so as to extend in the y-direction, which is "the direction different from the first direction". The bypass portion 622 is positioned in the negative direction of the x-axis with respect to the first welding terminal 211, the ground welding terminal 621, the power supply welding terminal 231, and a dummy connection portion 641 of the dummy terminal line 64. The bypass portion 622 is connected to the ground welding terminal 621 and the dummy connection portion 641 on the positive side of the x-axis.

The ground insert portion 620 is inserted into the sensor housing 70. The ground insert portion 620 is formed so as to extend in the positive direction of the y-axis through the opposite side of the magnet 823 of the IC package 50 and then extend in the negative direction of the x-axis. The side of the ground insert portion 620 opposite to the side connected to the ground welding terminal 221 is connected to the ground connector terminal 623.

The ground connector terminal 623 is positioned in the connector portion 71. The ground connector terminal 623 is formed so as to be electrically connectable to the ground via an external connector.

The dummy terminal line 64 includes the dummy connection portion 641, the dummy insert portion 642, and a dummy terminal 643, which is "the end portion of the dummy terminal line opposite to the side connected to the bypass portion".

The dummy connection portion 641 is provided in a position in which welding to the dummy lead line 59 is enabled. The dummy connection portion 641 is formed so as to extend in a direction along the x-axis. The side of the dummy connection portion 641 positioned in the negative direction of the x-axis is connected to the bypass portion 622. The side of the dummy connection portion 641 positioned in the positive direction of the x-axis is connected to the dummy insert portion 642. In FIG. 6, the virtual boundary line between the bypass portion 622 and the dummy connection portion 641 is represented by a dotted line VL60.

The dummy insert portion 642 is inserted into the sensor housing 70. The dummy insert portion 642 is formed so as to extend in the positive direction of the y-axis through the opposite side of the magnet 823 of the IC package 50 and then extend in the negative direction of the x-axis. The side of the dummy insert portion 642 opposite to the side connected to the dummy connection portion 641 is connected to the dummy terminal 643.

The dummy terminal 643 is positioned in the connector portion 31. The dummy terminal 643 is formed so as to be electrically connectable to the ground via an external connector.

As described above, in the rotation angle detecting device 3, the ground lead line 17 is connected to the ground through two paths. One path passes through the ground welding terminal 621, the ground insert portion 620, and the ground connector terminal 623. The other path passes through the ground welding terminal 621, the bypass portion 622, the dummy connection portion 641, the dummy insert portion 642, and the dummy terminal 643.

Next, the method of manufacturing the rotation angle detecting device 3 will be described with reference to FIG. 7A and FIG. 7B.

First, an original form of the sensor terminal 60 and an original form of the motor terminal 27 are formed by, for example, press work of a metal plate as "the terminal original form forming process".

Figure 7A:
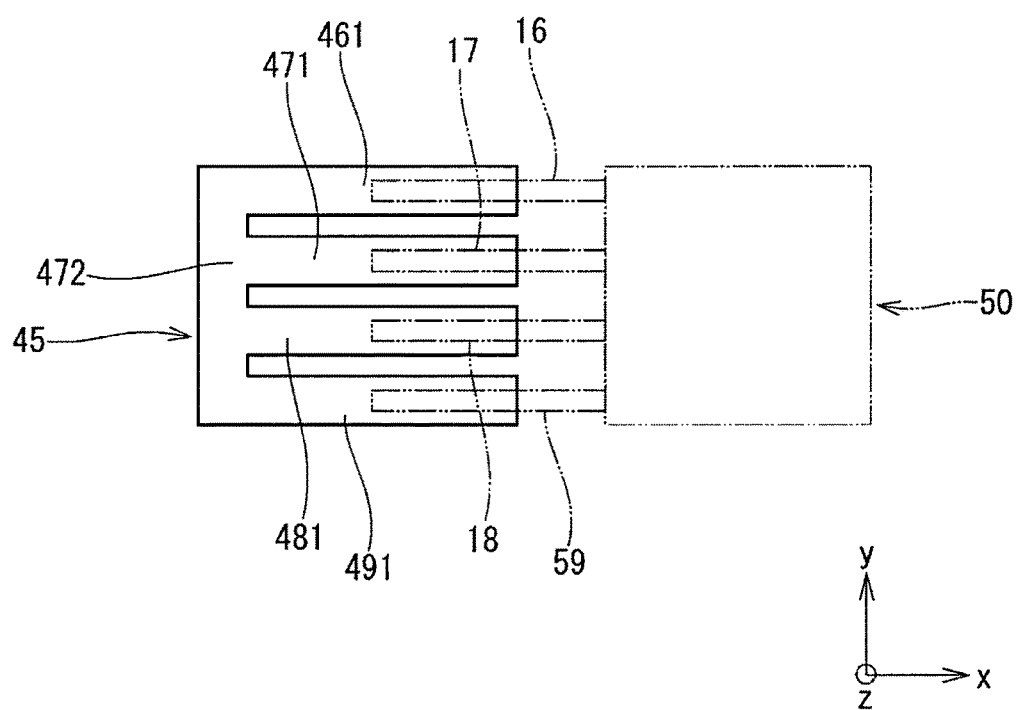
FIG. 7A is a schematic view illustrating the position detecting device according to the third embodiment of the present disclosure.

FIG. 7A is a partial enlarged view illustrating an original form 45 of the sensor terminal 60. In FIG. 7A, the IC package 50 to be connected to the sensor terminal 60 is represented by a dot-dot-dash line.

In the original form 45 of the sensor terminal 60, a portion 461 that is to become the first welding terminal 211, a portion 471 that is to become the ground welding terminal 621, a portion 481 that is to become the power supply welding terminal 231, a portion 491 that is to become the dummy connection portion 641 are connected by a die bar 472 that is to become the bypass portion 622.

Next, the sensor housing 70 into which the sensor terminal 60 and the motor terminal 27 have been inserted is molded as "the cutting process". FIG. 7B is a partial enlarged view illustrating the original form 45 of the sensor terminal 60 used to mold the sensor housing 70. In FIG. 7B, the IC package 50 to be connected to the sensor terminal 60 is represented by a dot-dot-dash line.

When the sensor housing 70 is molded, in the original form 45 of the sensor terminal 60, the portion 471 is kept connected to the die bar 472 and the portion 491 is kept connected to the die bar 472 while the portion 461 is cut off from the die bar 472 and the portion 481 is cut off from the die bar 472. In FIG. 7B, the portions that have been cut off at this time are represented by dotted lines 460 and 480. The sensor terminal 60 formed by cutting off the portions 461 and 481 from the die bar 472 and the motor terminal lines 28 and 29 from which the die bar has been cut off are set in a metal mold and then resin is injected into the metal mold to mold the sensor housing 70.

Finally, the IC package 50 that has been manufactured separately is mounted on the stage 32 of the sensor housing 70, the first welding terminal 211 whose original form is the portion 461 is electrically connected to the first lead line 16, the ground welding terminal 621 whose original form is the portion 471 is electrically connected to the ground lead line 17, the power supply welding terminal 231 whose original form is the portion 481 is electrically connected to the power supply lead line 18, and the dummy connection portion 641 whose original form is the portion 491 is electrically connected to the dummy lead line 59 by welding or the like.

This brings the rotation angle detecting device 3 to completion.

In the rotation angle detecting device 3 in the third embodiment, the bypass portion 622 of the ground terminal line 62 is connected to the dummy terminal line 64 provided on the opposite side of the ground terminal line 62 across the power supply terminal line 23. Accordingly, in the connector portion 71, the dummy terminal 643 of the dummy terminal line 64 electrically connected to the ground terminal line 62, the power supply connector terminal 233, and the first connector terminal 213, which is "the end portion of the signal terminal line opposite to the signal connection portion" are arranged in this order adjacently to the motor connector terminals 283 and 293 of the motor terminal lines 28 and 29. Thus, the third embodiment obtains the effects (A) to (C) of the first embodiment.

In addition, in the method of manufacturing the rotation angle detecting device 3 according to the third embodiment, when the original form 45 of the sensor terminal 60 is used as the sensor terminal 60, the die bar 472 kept connected to the portion 471 that is to become the ground welding terminal 621 and to the portion 481 that is to become the dummy connection portion 641 is used as the bypass portion 622 of the ground terminal line 62 while the portion 461 that is to become the first welding terminal 211 is cut off from the die bar 472 and the portion 481 that is to become the power supply welding terminal 231 is cut off from the die bar 472. This facilitates to form the connector portion 71 in which the dummy terminal line 64 electrically connected to the ground lead line 17 is enabled to be arranged adjacently to the motor terminal line 27.

Fourth Embodiment

Figure 8:
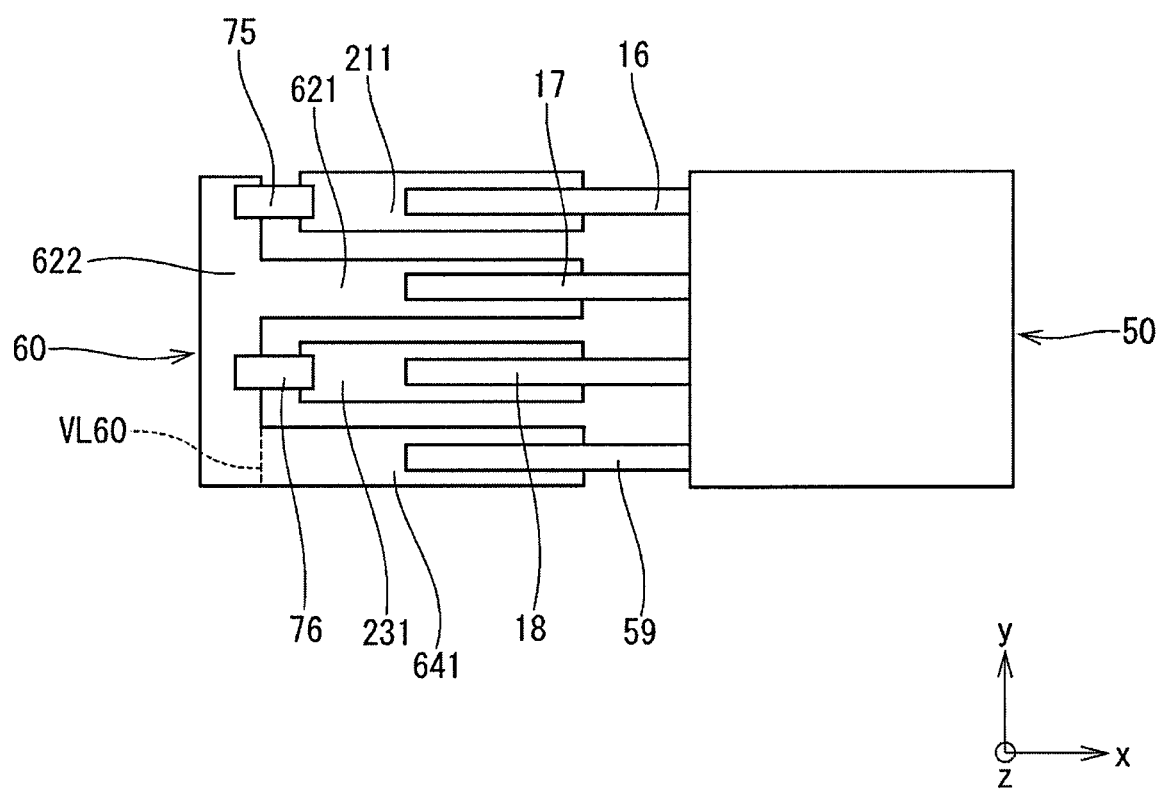
FIG. 8 is a schematic view illustrating a position detecting device according to a fourth embodiment of the present disclosure.

A position detecting device according to a fourth embodiment will be described with reference to FIG. 8. The fourth embodiment is different from the third embodiment in that capacitors are provided.

A rotation angle detecting device according to the fourth embodiment includes the IC package 50, the sensor terminal 60, the motor terminal 27, capacitors 75 and 76, and the sensor housing 70.

The capacitors 75 and 76 are provided in the IC package 50.

The capacitor 75 is provided so as to connect the first welding terminal 211 and the bypass portion 622 in a direction along the x-axis.

The capacitor 76 is provided so as to connect the power supply welding terminal 231 and the bypass portion 622 in a direction along the x-axis.

In the rotation angle detecting device according to the fourth embodiment, noise can be reduced by providing the external capacitors 75 and 76 between the first welding terminal 211 and the bypass portion 622 and between the power supply welding terminal 231 and the bypass portion 622. Accordingly, the fourth embodiment obtains the same effects as the second embodiment.

Other Embodiments

In the embodiment described above, the position detecting device is applied to the electronic control throttle device that controls the amount of intake air supplied to the engine installed in the vehicle. However, the field to which the position detecting device is applied is not limited to these examples.

Figure 6:
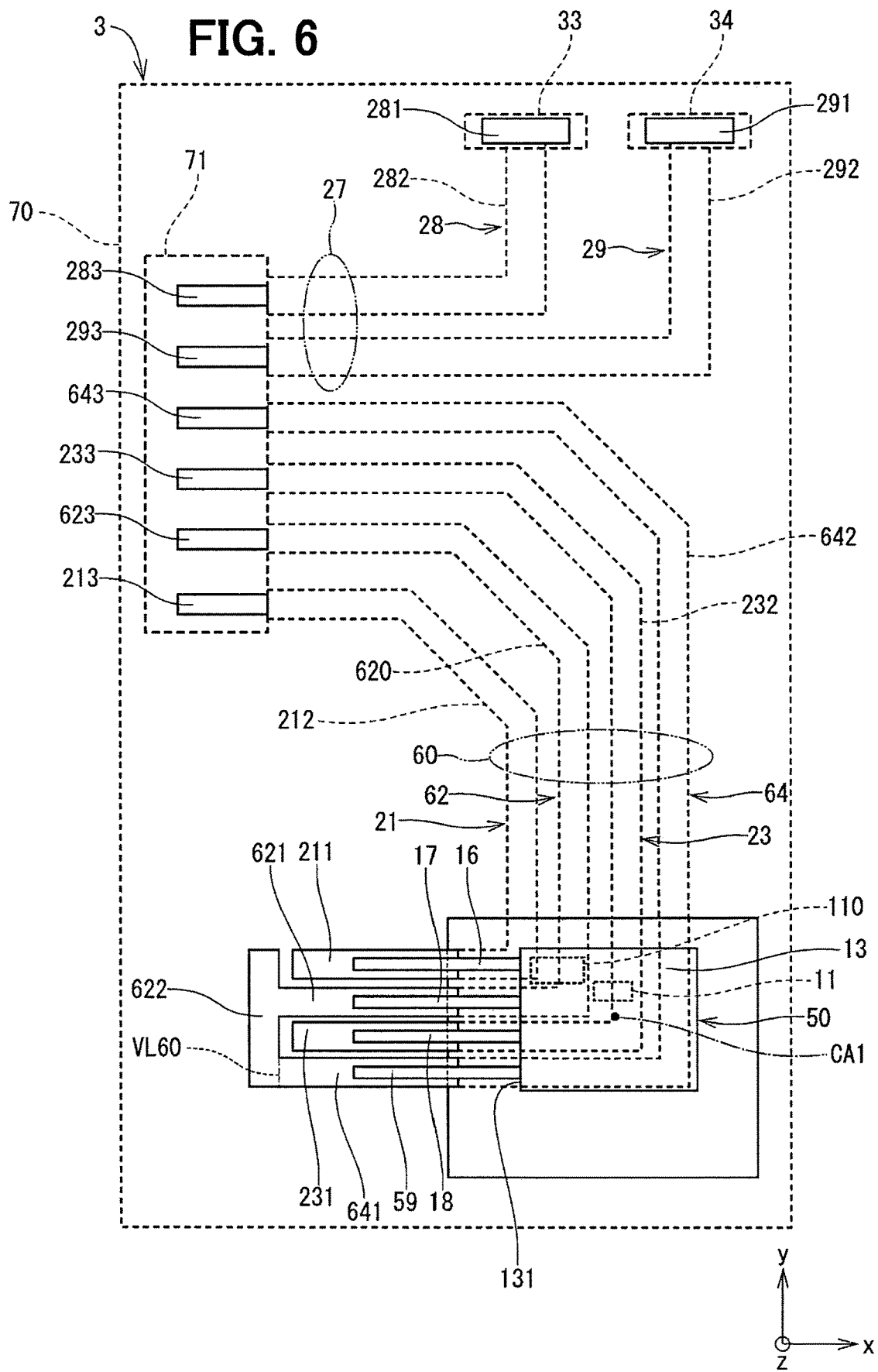
FIG. 6 is a schematic view illustrating an electronic control throttle device to which a position detecting device according to a third embodiment of the present disclosure is applied.
Figure 7B:
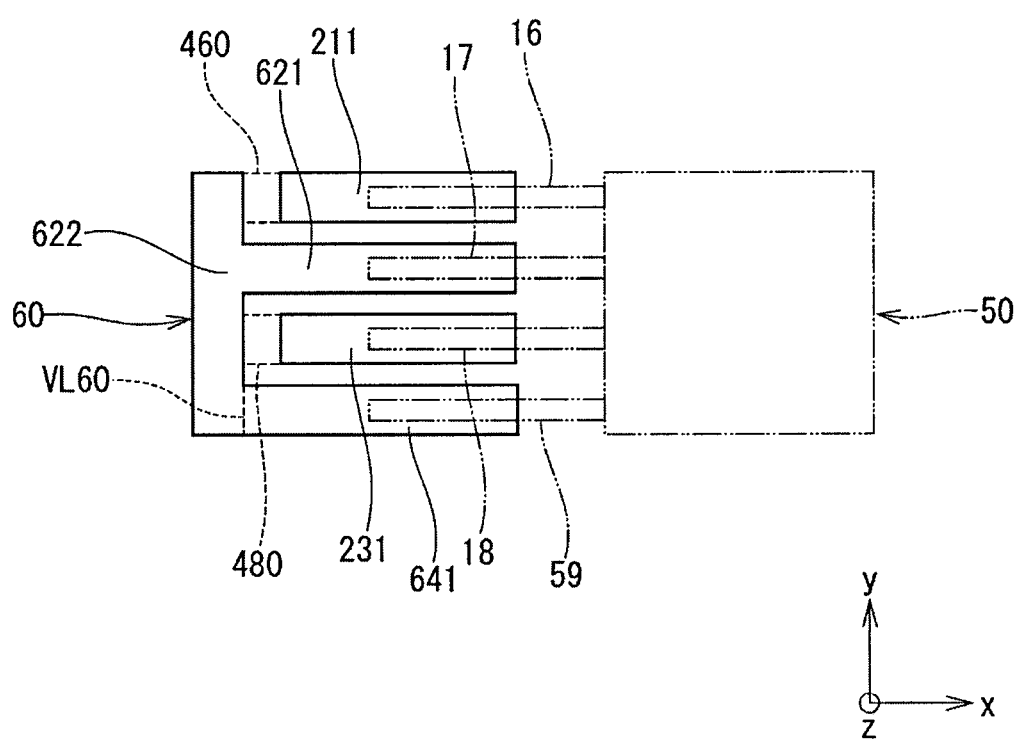
FIG. 7B is a schematic view illustrating the position detecting device according to the third embodiment of the present disclosure.

In the embodiments described above, the sensor terminal is formed so that one end portions connected to the lead lines are substantially parallel with the other end portions positioned in the connector portion, as illustrated in FIGS. 2 and 6. However, the shape of the sensor terminal is not limited to these examples.

In the embodiments described above, the bypass portion is formed so as to extend in the y-direction. However, the direction in which the bypass portion extends is not limited to these examples. The bypass portion only needs to be connected to the ground welding terminal on the positive side of the x-axis and extend in a direction different from the direction of the ground welding terminal.

In the second embodiment, the position detecting device has three capacitors. In the fourth embodiment, the position detecting device has two capacitors. The number of capacitors may be one.

In the second and fourth embodiments, capacitors are connected in a direction along the x-axis, which is the short direction of the housing. However, the direction in which capacitors are provided is not limited to these examples.

Figure 9:
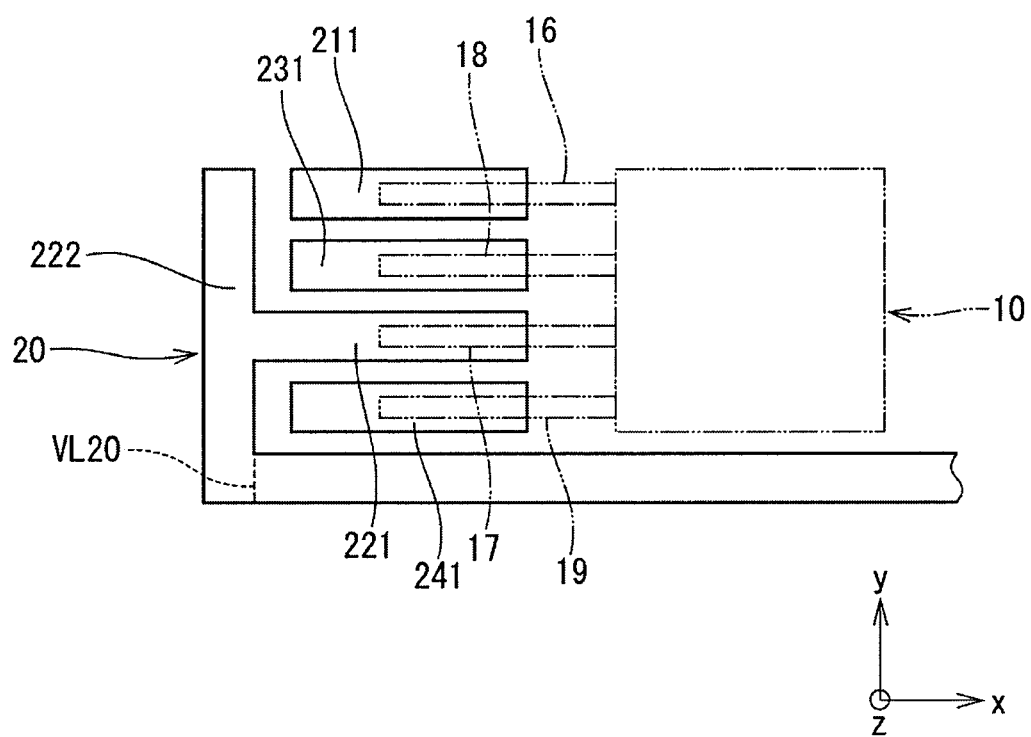
FIG. 9 is a schematic view illustrating a position detecting device according to another embodiment of the present disclosure.

In the first and second embodiments, in the IC package 10, the first lead line, the ground lead line, the power supply lead line, and the second lead line are arranged in this order from the positive side to the negative side of the y-axis so as to project in the negative direction of the x-axis. However, the order in which the lead lines are arranged is not limited to these examples. For example, as illustrated in FIG. 9, the first lead line 16, the power supply lead line 18, the ground lead line 17, and the second lead line 19 may be arranged in this order from the positive side to the negative side of the y-axis so as to project in the negative direction of the x-axis. Also in this case, as illustrated in FIG. 9, by providing the bypass portion 222 of the ground terminal line 22 in the negative direction of the x-axis with respect to the second lead line 19, the same effects as in the first and second embodiments can be obtained.

Figure 10:
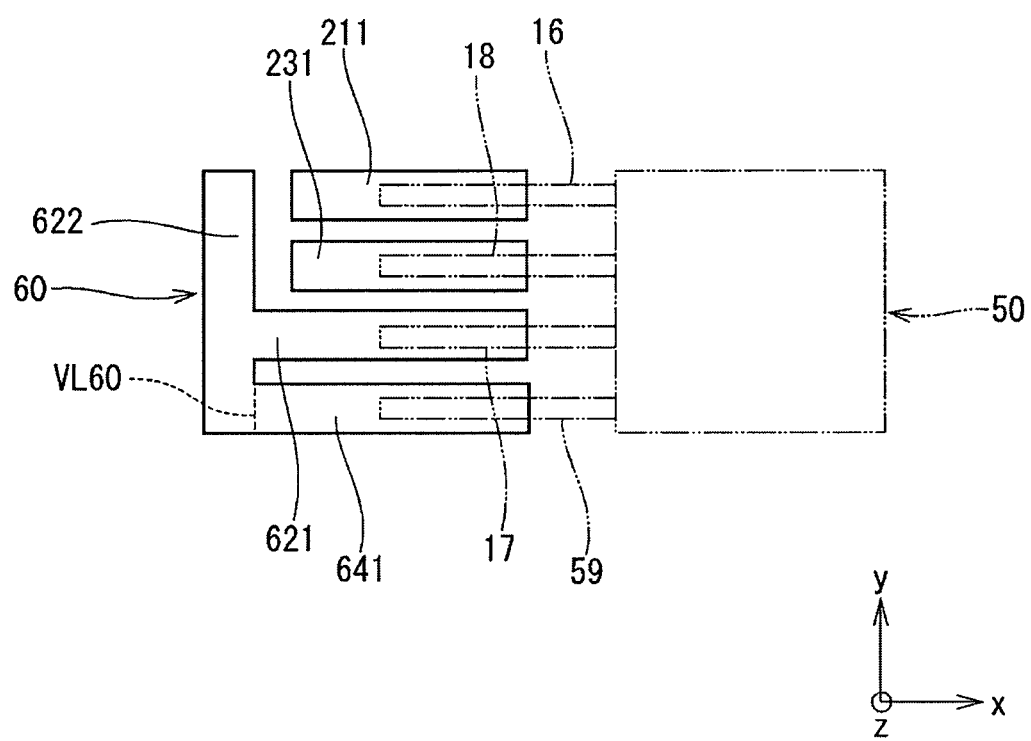
FIG. 10 is a schematic view illustrating a position detecting device according to another embodiment of the present disclosure.

This is also true of the third and fourth embodiments. For example, the same effects as in the third and fourth embodiments can be obtained even when the first lead line 16, the power supply lead line 18, the ground lead line 17, and the dummy lead line 59 are arranged in this order from the positive side to the negative side of the y-axis so as to project in the negative direction of the x-axis, as illustrated in FIG. 10.

In the first and second embodiments, the IC package has the first signal processing circuit and the second signal processing circuit. In the third and fourth embodiments, the IC package has first signal processing circuit. However, the IC package may have neither the first signal processing circuit nor the second signal processing circuit. In addition, in the IC package, the first magnetic detection element is provided separately from the first signal processing circuit or the second magnetic detection element is provided separately from the second signal processing circuit. The first magnetic detection element may be integrated with the first signal processing circuit or the second magnetic detection element may be integrated with the second signal processing circuit.

The magnetic detection element according to the embodiments described above may be a magnetic detection element such as a hall element or an MR element that only needs to output a signal that depends on a component of a magnetic field or the strength of the component.

In the embodiments described above, the lead lines are electrically connected to the terminal lines by welding. However, the method of electric connection between the lead lines and the terminal lines is not limited to these examples. The welding may be resistance welding or laser welding. In addition, coupling may be performed by soldering or conductive adhesive.

The present disclosure is not limited to these embodiments and may be practiced in various forms without departing from the spirit of the present disclosure.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A position detecting device configured to detect a position of a detection target, the position detecting device comprising:
   an IC package including:
      a first magnetic detection element configured to output a signal that depends on a first component of an ambient magnetic field or a strength of the first component,
      a second magnetic detection element configured to output a signal that depends on a second component of the ambient magnetic field different from the first component or a strength of the second component,
      a sealing portion in which the first magnetic detection element and the second magnetic detection element are sealed,
      a first lead line that projects in a first direction of a first axis from a surface of the sealing portion to output therethrough a first signal output by the first magnetic detection element to an outside,
      a ground lead line that projects in the first direction of the first axis from the surface of the sealing portion to cause a current that has flowed through the first magnetic detection element and the second magnetic detection element to flow therethrough to a ground,
      a power supply lead line that projects in the first direction of the first axis from the surface of the sealing portion to cause a current to flow therethrough toward the first magnetic detection element and the second magnetic detection element, and
      a second lead line that projects in the first direction of the first axis from the surface of the sealing portion to output therethrough a second signal output by the second magnetic detection element to the outside, the ground lead line and the power supply lead line provided between the first lead line and the second lead line;
   a first terminal line extending in a direction opposite to the first direction from a first connection portion electrically connectable to the first lead line;
   a ground terminal line including a ground connection portion, which is electrically connectable to the ground lead line, and a bypass portion, which extends in a second direction of a second axis, the bypass portion being connected to an end of the ground connection portion in the first direction;
   a power supply terminal line extending in the direction opposite to the first direction from a power supply connection portion electrically connectable to the power supply lead line;
   a second terminal line extending in the direction opposite to the first direction from a second connection portion electrically connectable to the second lead line;
   a bypass terminal line positioned on an opposite side of the ground terminal line across the first terminal line or the second terminal line and connected to the bypass portion;
   motor terminal lines having one end portions electrically connected to a motor to supply electric power therethrough to the motor to rotate the detection target; and a connector portion, wherein in the connector portion:
other end portions of the motor terminal line,
an end portion of the bypass terminal line opposite to a side connected to the bypass portion,
an end portion of the second terminal line opposite to the second connection portion,
an end portion of the power supply terminal line opposite to the power supply connection portion, and
an end portion of the first terminal line opposite to the first connection portion are placed in this order, and wherein
the bypass terminal line is connected with the ground connection portion via a bypass connection portion and the bypass portion, and
the bypass terminal line, the bypass connection portion, and the bypass portion extend to surround an end of the power supply connection portion in the first direction and an end of the second connection portion in the first direction.

2. The position detecting device according to claim 1, further comprising:
a capacitor electrically connecting at least one of the first terminal line, the power supply terminal line, or the second terminal line to the bypass portion.

3. The position detecting device according to claim 2, further comprising:
a housing supporting the first terminal line, the ground terminal line, the power supply terminal line, the second terminal line, and the bypass terminal line, wherein the capacitor is placed along a short direction of the housing in which the housing is shorter in length than an other direction perpendicular to the short direction.

4. The position detecting device according to claim 1, wherein the first connection portion, the ground connection portion, the power supply connection portion, and the second connection portion are positioned at the same flat plane.

5. The position detecting device according to claim 1, wherein the bypass portion extends in a direction opposite different from the first direction.

6. The position detecting device according to claim 1, wherein the first direction of the first axis includes a negative direction of the first axis.

7. The position detecting device according to claim 1, wherein the first direction of the first axis includes a negative direction of an x-axis from the surface of the sealing portion.

8. The position detecting device according to claim 1, wherein the direction opposite to the first direction of the first axis includes a positive direction of an x-axis from the surface of the sealing portion.

9. The position detecting device according to claim 1, wherein the end of the power supply connection portion in the first direction and the end of the second connection portion in the first direction are opposed to the bypass portion.

10. The position detecting device according to claim 9, wherein the bypass terminal line is connected only with the ground connection portion that is a singular element.

11. The position detecting device according to claim 9, wherein the bypass terminal line is connected with the ground connection portion via a bypass connection portion and the bypass portion without branching.

12. A method of manufacturing a position detecting device configured to detect a position of a detection target, the position detecting device including:
an IC package including:
a first magnetic detection element configured to output a signal that depends on a first component of an ambient magnetic field or a strength of the first component,
a second magnetic detection element configured to output a signal that depends on a second component of the ambient magnetic field different from the first component or a strength of the second component,
a sealing portion in which the first magnetic detection element and the second magnetic detection element are sealed,
a first lead line that projects in a first direction of a first axis from a surface of the sealing portion to output therethrough a first signal output by the first magnetic detection element to an outside,
a ground lead line that projects in the first direction of the first axis from the surface of the sealing portion to cause a current that has flowed through the first magnetic detection element and the second magnetic detection element to flow therethrough to a ground,
a power supply lead line that projects in the first direction of the first axis from the surface of the sealing portion to cause a current to flow therethrough toward the first magnetic detection element and the second magnetic detection element, and
a second lead line that projects in the first direction of the first axis from the surface of the sealing portion to output therethrough a second signal output by the second magnetic detection element to the outside, the ground lead line and the power supply lead line provided between the first lead line and the second lead line;
a first terminal line extending in a direction opposite to the first direction from a first connection portion electrically connectable to the first lead line;
a ground terminal line including a ground connection portion, which is electrically connectable to the ground lead line, and a bypass portion, which extends in a second direction of a second axis, the bypass portion being connected to an end of the ground connection portion in the first direction;
a power supply terminal line extending in the direction opposite to the first direction from a power supply connection portion electrically connectable to the power supply lead line;
a second terminal line extending in the direction opposite to the first direction from a second connection portion electrically connectable to the second lead line,
a bypass terminal line positioned on an opposite side of the ground terminal line across the first terminal line or the second terminal line and connected to the bypass portion,
motor terminal lines having one end portions electrically connected to a motor to supply electric power therethrough to the motor to rotate the detection target, and
a connector portion, wherein in the connector portion:
other end portions of the motor terminal line,
an end portion of the bypass terminal line opposite to a side connected to the bypass portion,
an end portion of the second terminal line opposite to the second connection portion,
an end portion of the power supply terminal line opposite to the power supply connection portion, and
an end portion of the first terminal line opposite to the first connection portion are placed in this order,
wherein the method comprising:
integrally forming, in a terminal original form forming process, as an original form of a sensor terminal,
the first connection portion of the first terminal line,
the ground connection portion of the ground terminal line, the power supply connection portion of the power supply terminal line,
the second connection portion of the second terminal line,
the bypass terminal line, and
a die bar,
such that the die bar is connected to, on a side of the ground connection portion in the first direction,
the first connection portion,
the ground connection portion,
the power supply connection portion,
the second connection portion, and
the bypass terminal line; and
cutting off, in a cutting process after the terminal original form forming process,
the first connection portion from the die bar,
the power supply connection portion from the die bar, and
the second connection portion from the die bar, such that
the bypass terminal line is connected with the ground connection portion via a bypass connection portion and the bypass portion, and
the bypass terminal line, the bypass connection portion, and the bypass portion extend to surround an end of the power supply connection portion in the first direction and an end of the second connection portion in the first direction.

13. A position detecting device configured to detect a position of a detection target, the position detecting device comprising:
an IC package including:
a first magnetic detection element configured to output a signal that depends on a first component of an ambient magnetic field or a strength of the first component,
a second magnetic detection element configured to output a signal that depends on a second component of the ambient magnetic field different from the first component or a strength of the second component,
a sealing portion in which the first magnetic detection element and the second magnetic detection element are sealed,
a first lead line that projects in a first direction of a first axis from a surface of the sealing portion to output therethrough a first signal output by the first magnetic detection element to an outside,
a ground lead line that projects in the first direction of the first axis from the surface of the sealing portion to cause a current that has flowed through the first magnetic detection element and the second magnetic detection element to flow therethrough to a ground,
a power supply lead line that projects in the first direction of the first axis from the surface of the sealing portion to cause a current to flow therethrough toward the first magnetic detection element and the second magnetic detection element, and
a second lead line that projects in the first direction of the first axis from the surface of the sealing portion to output therethrough a second signal output by the second magnetic detection element to the outside, the ground lead line and the power supply lead line provided between the first lead line and the second lead line;
a first terminal line extending in a direction opposite to the first direction from a first connection portion electrically connectable to the first lead line;
a ground terminal line including a ground connection portion, which is electrically connectable to the ground lead line, and a bypass portion, which extends in a second direction of a second axis, the bypass portion being connected to an end of the ground connection portion in the first direction;
a power supply terminal line extending in the direction opposite to the first direction from a power supply connection portion electrically connectable to the power supply lead line;
a second terminal line extending in the direction opposite to the first direction from a second connection portion electrically connectable to the second lead line, wherein the bypass portion being connected to a bypass connection portion positioned in the second direction of the second axis with respect to the second connection portion of the second terminal line;
a bypass terminal line positioned on an opposite side of the ground terminal line across the first terminal line or the second terminal line and connected to the bypass portion, the bypass terminal line being connected to the ground terminal line via the bypass connection portion;
motor terminal lines having one end portions electrically connected to a motor to supply electric power therethrough to the motor to rotate the detection target; and
a connector portion, wherein in the connector portion:
other end portions of the motor terminal line,
an end portion of the bypass terminal line opposite to a side connected to the bypass portion,
an end portion of the second terminal line opposite to the second connection portion,
an end portion of the power supply terminal line opposite to the power supply connection portion, and
an end portion of the first terminal line opposite to the first connection portion are placed in this order, and
the end portion of the bypass terminal line is arranged adjacently to motor connector terminals of the motor terminal lines.

14. A method of manufacturing a position detecting device configured to detect a position of a detection target, the position detecting device including:
an IC package including:
a first magnetic detection element configured to output a signal that depends on a first component of an ambient magnetic field or a strength of the first component,
a second magnetic detection element configured to output a signal that depends on a second component of the ambient magnetic field different from the first component or a strength of the second component,
a sealing portion in which the first magnetic detection element and the second magnetic detection element are sealed,
a first lead line that projects in a first direction of a first axis from a surface of the sealing portion to output therethrough a first signal output by the first magnetic detection element to an outside,
a ground lead line that projects in the first direction of the first axis from the surface of the sealing portion to cause a current that has flowed through the first magnetic detection element and the second magnetic detection element to flow therethrough to a ground,
a power supply lead line that projects in the first direction of the first axis from the surface of the sealing portion to cause a current to flow therethrough toward the first magnetic detection element and the second magnetic detection element, and a second lead line that projects in the first direction of the first axis from the surface of the sealing portion to output therethrough a second signal output by the second magnetic detection element to the outside, the ground lead line and the power supply lead line provided between the first lead line and the second lead line;

a first terminal line extending in a direction opposite to the first direction from a first connection portion electrically connectable to the first lead line;

a ground terminal line including a ground connection portion, which is electrically connectable to the ground lead line, and a bypass portion, which extends in a second direction of a second axis, the bypass portion being connected to an end of the ground connection portion in the first direction;

a power supply terminal line extending in the direction opposite to the first direction from a power supply connection portion electrically connectable to the power supply lead line;

a second terminal line extending in the direction opposite to the first direction from a second connection portion electrically connectable to the second lead line, wherein the bypass portion being connected to a bypass connection portion positioned in the second direction of the second axis with respect to the second connection portion of the second terminal line, a bypass terminal line positioned on an opposite side of the ground terminal line across the first terminal line or the second terminal line and connected to the bypass portion, the bypass terminal line being connected to the ground terminal line via the bypass connection portion, motor terminal lines having one end portions electrically connected to a motor to supply electric power therethrough to the motor to rotate the detection target, and a connector portion, wherein in the connector portion:
  other end portions of the motor terminal line,
  an end portion of the bypass terminal line opposite to a side connected to the bypass portion,
  an end portion of the second terminal line opposite to the second connection portion,
  an end portion of the power supply terminal line opposite to the power supply connection portion, and
  an end portion of the first terminal line opposite to the first connection portion are placed in this order, and
  the end portion of the bypass terminal line is arranged adjacently to motor connector terminals of the motor terminal lines, wherein the method comprising:

integrally forming, in a terminal original form forming process, as an original form of a sensor terminal,
  the first connection portion of the first terminal line,
  the ground connection portion of the ground terminal line,
  the power supply connection portion of the power supply terminal line,
  the second connection portion of the second terminal line,
  the bypass terminal line, and
  a die bar,
  such that the die bar is connected to, on a side of the ground connection portion in the first direction,
  the first connection portion,
  the ground connection portion,
  the power supply connection portion,
  the second connection portion, and
  the bypass terminal line; and cutting off, in a cutting process after the terminal original form forming process,
  the first connection portion from the die bar,
  the power supply connection portion from the die bar, and
  the second connection portion from the die bar.

* * * * *